US006246754B1

(12) United States Patent
Cole et al.

(10) Patent No.: US 6,246,754 B1
(45) Date of Patent: *Jun. 12, 2001

(54) MECHANISM FOR CHANGING A MODEM'S CONNECTION RATE WITHIN A FAMILY OF INTEROPERABLE MODEMS

(75) Inventors: Terry Lynn Cole; Charles Ray Boswell, Jr., both of Austin, TX (US)

(73) Assignee: Legerity, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,015

(22) Filed: Jun. 9, 1998

(51) Int. Cl.[7] .................................................. H04M 11/00
(52) U.S. Cl. ..................................... 379/93.29; 379/93.31
(58) Field of Search ............................. 379/93.29, 93.31, 379/93.33, 93.34, 93.28; 375/222

(56) References Cited

U.S. PATENT DOCUMENTS

| 4,771,417 | * | 9/1988 | Maxwell et al. | 379/93.33 |
| 4,905,282 | * | 2/1990 | McGlynn et al. | 379/93.08 |
| 4,928,305 | * | 5/1990 | Yui | 379/93.28 |
| 5,343,515 | * | 8/1994 | Treffkorn | 379/93.33 |
| 5,450,438 | * | 9/1995 | Landry et al. | 379/93.33 |
| 5,726,765 | * | 3/1998 | Yoshida et al. | 379/93.33 |
| 5,802,153 | * | 9/1998 | Sridhar et al. | 379/93.28 |
| 5,818,913 | * | 10/1998 | O'Mahony | 379/93.31 |

* cited by examiner

Primary Examiner—Stella Woo
(74) Attorney, Agent, or Firm—Conley, Rose & Tayon, P.C.; B. Noel Kivlin

(57) ABSTRACT

A modem which enables re-negotiation of the selected modem technology subsequent to the original negotiation which takes place at initiation of the modem connection. The invention includes means for one modem to interrupt data transfer and transmit a signal to the other modem indicating a request that a different modem technology be used. The request may be made as a result of changing line conditions, changing system demands, changing data transfer requirements, or other altered conditions under which the modems are operating. If the modem receiving the request accepts the request, both modems re-enter negotiation to select the best modem technology under the changed conditions. The modems are then re-trained to select the best bit rate within that technology under the existing line conditions. After the new modem technology and bit rate are selected, the modems resume transferring data.

32 Claims, 3 Drawing Sheets

MECHANISM FOR CHANGING A MODEM'S CONNECTION RATE WITHIN A FAMILY OF INTEROPERABLE MODEMS

BACKGROUND OF THE INVENTION

1. Field of the Invention

The invention relates generally to modems and more particularly to a mechanism for changing the modem technology that is selected by a pair of modems to be used as the basis for communications between the modems.

2. Description of the Relevant Art

In order to establish communications between two modems, it is necessary to define a framework within which the modems will communicate. This communication framework is related to the technologies employed by the respective modems. The process of selecting the proper framework is referred to as inter-working or handshaking. At the beginning of the handshaking process, the modems select a particular modem technology which will be used in the communications. Although a modem may employ a modern modem technology, most modems implement older technologies as well. This allows a given modem to be compatible with other modems which use the older technologies.

The selection of the modem technology to be used in communications between a pair of modems is referred to herein as negotiation. During the negotiation stage, one modem identifies the technology of the other. If one modem uses a newer technology, this modem will detect the older technology of the other modem and "fall back" or use the older technology. In this manner, the modems will typically select the most recent technology which is common to both modems.

Each modem technology allows communications to be conducted at a range of speeds, or bit rates. Typically, more recently developed technologies have higher allowable bit rates than older technologies. One of the bit rates allowed by the selected technology is selected by the modems for the connection. The bit rate selected by the modems is a function of the quality of the telephone line used for the connection— the more noise on the line, the slower the bit rate that will be chosen. The selection of the appropriate bit rate is referred to herein as training.

The handshaking process thus consists of a negotiation to select a modem technology and training to select the highest speed allowed by the selected technology and the line quality. At the conclusion of the handshaking process, the modems can begin transmitting data to each other (although it is not necessary that data be transferred—the modem connection may have been established in anticipation of future data transfers.)

Some modems are configured to re-enter the training stage if the condition of the telephone connection changes during communications between the modems. This process is referred to herein as re-training. While re-training can be used to select a speed suitable to the changed condition of the telephone line, the speed must be one allowed by the previously selected modem technology. The selected modem technology cannot be changed during re-training. In order to select a different modem technology, the telephone connection must be dropped and re-established, after which the entire handshaking process must be repeated. Changing the modem technology in the prior art thus incurs all of the overhead associated with establishing a new connection. There is also the possibility that there may not be a line available or that the quality of the connection may have more noise than the previous connection.

SUMMARY OF THE INVENTION

The present invention is directed to dynamically reconfigurable modems. That is, it allows a pair of modems which have already completed the handshaking process to re-enter negotiation and select a modem technology different from the one originally selected without having to disconnect and then re-establish the connection between the modems.

The invention includes means for one modem to interrupt data transfer and transmit a signal to the other modem indicating a request that a different modem technology be used. The request may be made as a result of changing line conditions, changing system demands, changing data transfer requirements, or other altered conditions under which the modems are operating. If the modem receiving the request accepts the request, both modems re-enter negotiation to select the best modem technology which suits the changed conditions. The modems are then re-trained to select the highest available bit rate within that technology which is appropriate to the line conditions. After the new modem technology and bit rate are selected, the modems resume transferring data.

BRIEF DESCRIPTION OF THE DRAWINGS

Other objects and advantages of the invention will become apparent upon reading the following detailed description and upon reference to the accompanying drawings in which.

Figure 1:
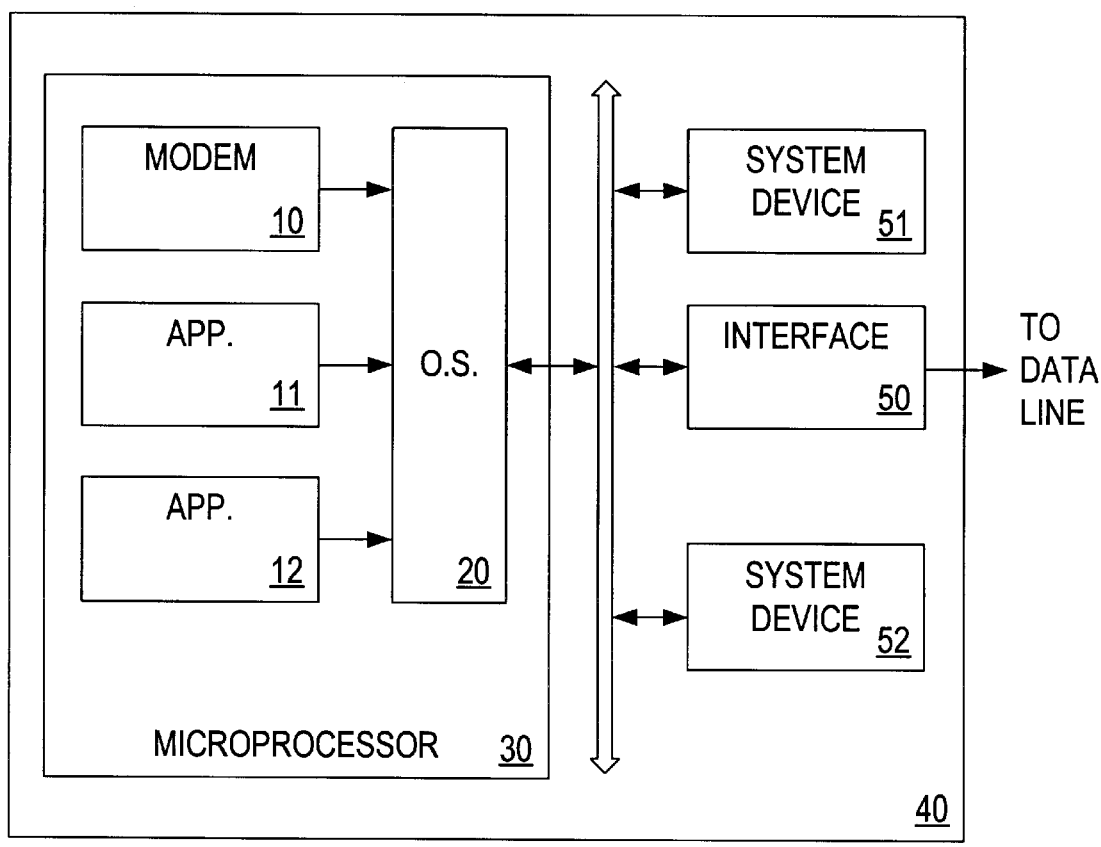
FIG. 1 is a block diagram illustrating a computer system in which one embodiment of the invention is implemented.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring to FIG. 1, one embodiment of the invention is a software-implemented modem application 10 executing on the microprocessor 30 of a host computer system 40. Modem application 10 executes under operating system 20 and may have to compete with other applications 11, 12 for processing time. The modem application may also have to compete with interrupt requests from various system devices 51, 52. The microprocessor 30 uses interface 50 to send and receive signals over the data line. Modem application 10 is configured to enable renegotiation of the selected modem technology after the initial handshaking is complete and data transfer has begun. The modem is host-based (i.e., executed in the microprocessor of a host computer.) The selection of a new technology allows the modem to adapt its operation to suit conditions which have changed since the modem first established communications with another modem.

The modem is configured to monitor various conditions of the computing and data transfer environments. These conditions may include telephone line quality, the amount of data that needs to be transferred, the priority of the data transfer, the constraints on the data transfer (e.g., real-time delivery), the utilization of the microprocessor by the modem, the utilization of the microprocessor by other devices and applications and other conditions. Rather than simply selecting the most recent technology common to the pair of communicating modems and choosing one of the allowable bit rates for that technology based on the quality of the telephone line, the modem chooses a technology and a bit rate which are best suited to the computing and data transfer environments. The modem selects the appropriate technology and bit rate in this manner both at the initiation of the modem connection and at times subsequent to initiation when it is determined by the modem that it would be advantageous to re-select the technology and bit rate. The technology and bit rate are re-selected as part of the current modem connection rather than having to terminate the connection, establish a new connection and select the technology and bit rate during handshaking for the new connection. ("Modem connection" as used herein refers to an instance of modem communications beginning with a call from one modem to another and ending with the termination or disconnection of the call.)

A modem (which is derived from MOdulator-DEModulator) normally receives digital data from a source such as a computer and converts the data into analog signals, which can then be transmitted over a standard telephone line. Similarly, analog signals received over the telephone line are converted to digital signals which are transmitted to the computer. As used herein, however, "modem" refers not only to these types of modems, but also to data transfer devices which may not convert the digital data into analog signals before transmitting it. For example, the invention can also be implemented in ISDN and xDSL devices. These devices are often referred to as modems even though they do not make the analog-to-digital and digital-to-analog conversion in the same manner as conventional modems. Accordingly, terms used herein to describe modems are intended to be construed so as to have this same breadth and to encompass these digital devices.

Figure 2:
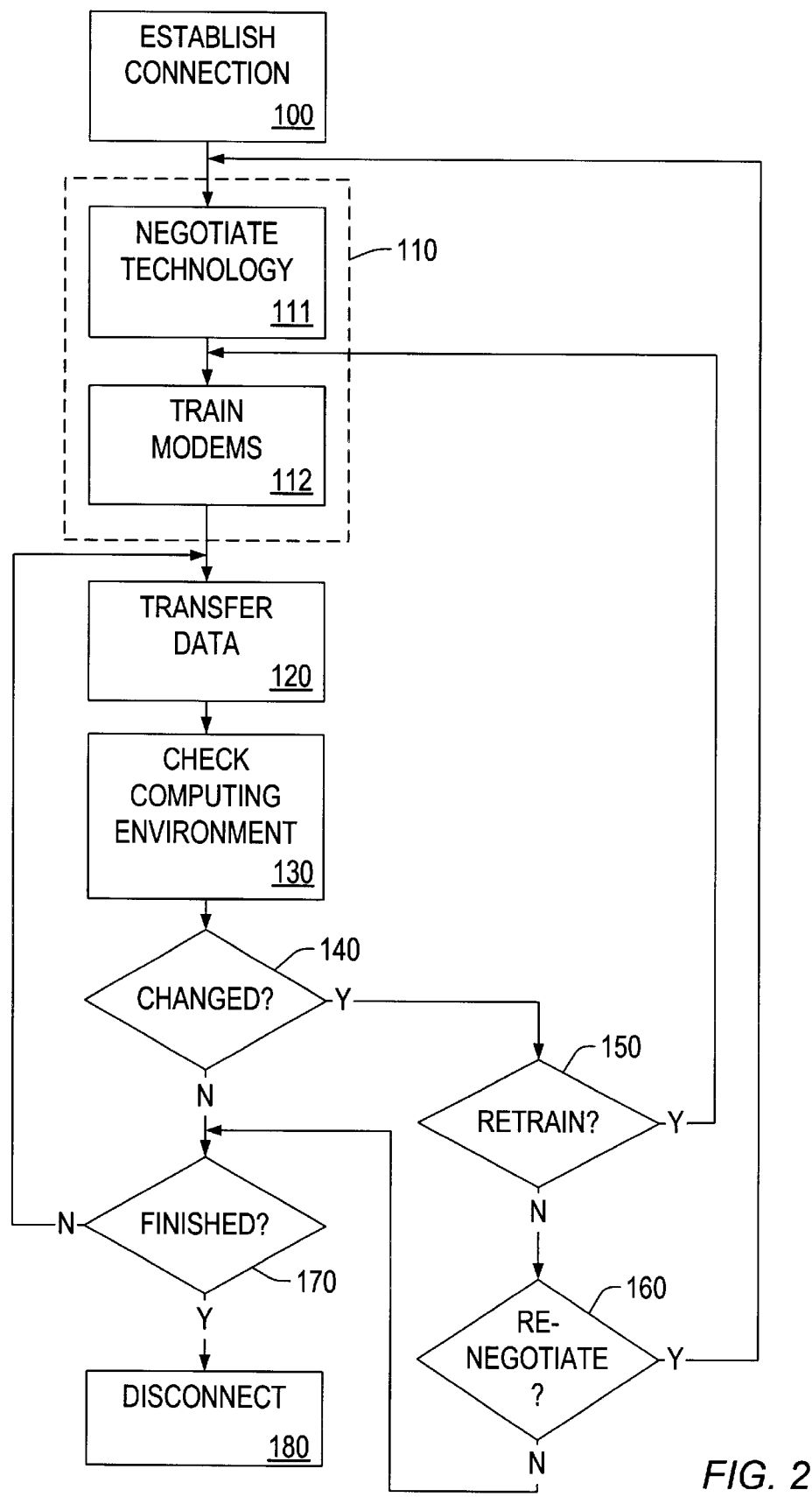
FIG. 2 is a flow chart illustrating the operation of one embodiment of the invention.

Referring to FIG. 2, a flow chart illustrating the operation of one embodiment of the invention is shown. Following initiation of the telephone connection 100, the modems perform a handshaking procedure 110. Handshaking procedure 110 is used to determine the protocol (which includes bit rate and modem technology) for the transfer of data over the modem connection. After the transfer protocol has been established, the modems begin to transfer data to each other 120. Periodically during the data transfer, the modems will check one or more parameters of the computing environment which may affect the transfer 130. If the values have changed since the last time they were checked 140, one of the modems may determine that the currently selected bit rate or modem technology is not the most efficient or most appropriate for the data which has yet to be transferred. "Modem technology" as used herein refers generally to a particular specification or a particular level of technology used by a modem. If it is determined that a different technology or bit rate is better adapted to the upcoming data transfer, one of the modems can signal the other that renegotiation 160 or retraining 150 should be performed. If the other modem agrees, the modems re-enter the negotiation 111 and/or training 112 phases of the handshaking procedure 110 and then continue transferring data 120 under the newly selected technology and/or bit rate. If it would not be beneficial to retrain the modems or renegotiate the technology, the modems will determine whether the modem connection should be terminated 170. If not, the modems will continue to transfer data 120. If so, the modems will disconnect 180.

As described above, selection of the appropriate protocol for the modem connection involves negotiation of the modem technology as well as the training of the modems to use a particular speed or bit rate. Each modem utilizes a particular modem technology. Each new modem technology typically offers technological advances (e.g., in compression or error-correction) as well as higher data transfer rates (bit rates.) Although these new technologies may offer advantages over older, simpler technologies, the older technologies are incorporated into them in order to allow greater compatibility between different modems. Table 1 lists (from older to more recent) some of the currently used modem technologies and some of their characteristics. It can be seen from the table that the maximum data transfer rates typically increase with the more recent technologies. Most of the listed technologies are standards set by the Consultative Committee on International Telephone and Telegraphy (the CCITT,) now known as the International Telecommunications Union, Telecommunication Standardization Sector (ITU-T). The CCITT/ITU is the primary international body for developing international standards for telecommunications systems.

TABLE 1

| MODEM TECHNOLOGY | CHARACTERISTICS |
| --- | --- |
| V.21 | Maximum rate is 300 bits per second |
| V.22 | Maximum rate is 1200 bits per second |
| V.22bis | Maximum rate is 2400 bits per second |
| V.32 | Maximum rate is 9600 bits per second |
| V.32bis | Maximum rate is 14,400 bits per second (fallback to 12,000, 9600, 7200, or 4800 bits per second) |
| V.32terbo (not a CCITT/ITU standard) | Maximum rate is 19,200 bits per second (fallback to 12,000; 9600, 7200, or 4800 bits per second; can operate at higher data rates with compression) |
| V.34 | Maximum rate is 28,800 bits per second (fallback to 24,000 or 19,200 bits per second; backwards compatibility with V.32 and V.32bis) |
| V.34bis | Maximum rate is 33,600 bits per second (fallback to 31,200 24,000 or 19,200 bits per second) |
| V.90 | Maximum rate is 56,000 bits per second |

Figure 3:
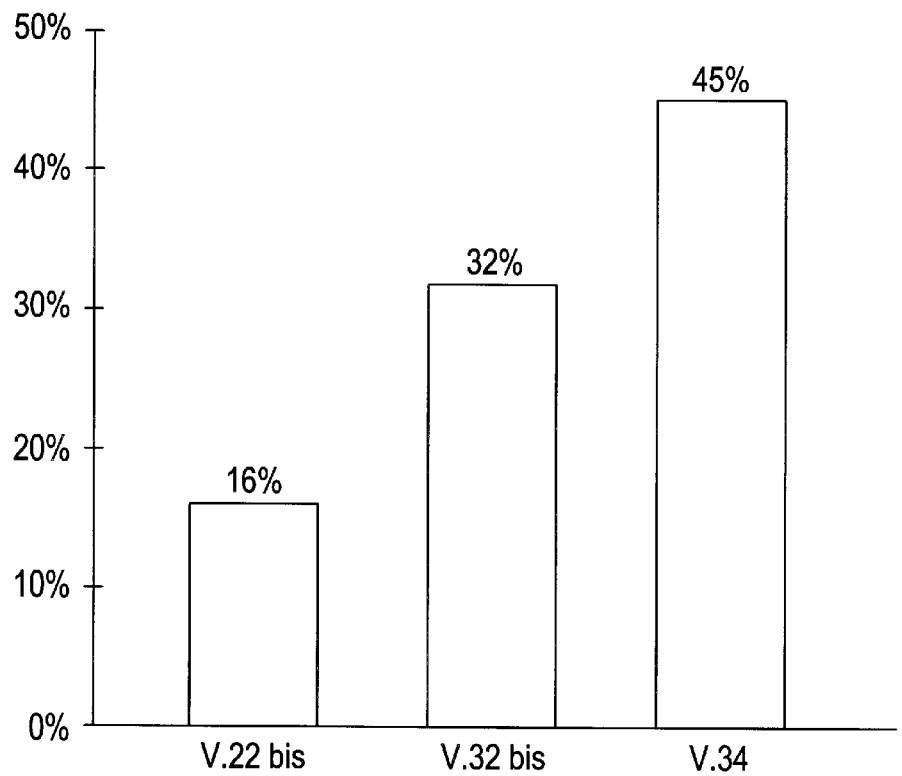
FIG. 3 is a bar graph of microprocessor utilization versus modem technology.
Figure 4:
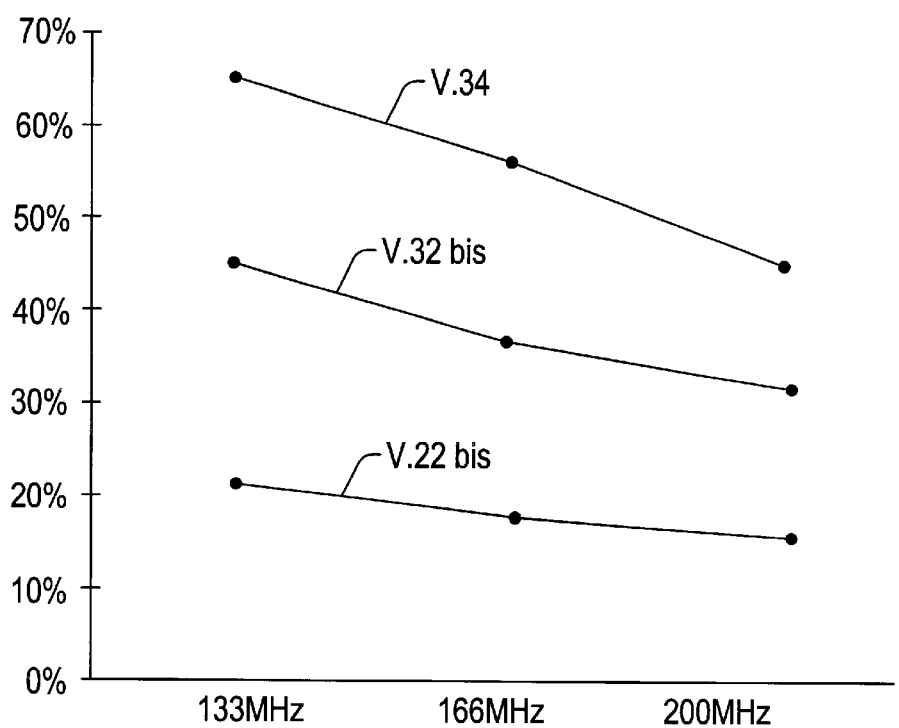
FIG. 4 is a graph of microprocessor utilization versus microprocessor clock rate.

The negotiation of a modem technology involves determining which of the available modem technologies is available to both of the modems. Although the selection of the most recent technology common to both modems is the only objective of negotiation in prior art modems, in the invention it serves to establish, in a sense, an upper limit on the choice of technologies. Other factors may cause a modem designed in accordance with the invention to select a common technology which is not the most recent. For example, if a modem incorporating V.34bis technology negotiates with a modem incorporating V.34 technology, it will be determined that V.34 is the most recent common technology. If, however, the modem connection is established in order to transfer small amounts of data in the background while a computation-intensive application executes in the foreground, it may be more efficient to choose an older technology. As shown in FIG. 3, a bar graph of microprocessor utilization versus modem technology, V.34 utilizes more of the microprocessor than older technologies such as V.32bis or V.22bis. Thus, selection of one of these older technologies will allow greater utilization of the microprocessor by the application executing in the foreground. On the other hand, if the modem connection is required to support a greater transfer rate, or if the data transfer must satisfy real-time constraints (e.g., for reconstruction of voice data,) then the more recent technology may be required. FIG. 4 is a graph of microprocessor utilization versus microprocessor clock rate. This figure shows that each technology utilizes a greater percentage of the microprocessor's computing power at lower clock rates. Conservation of the computing power (by using older technologies) is therefore even more important for those consumers who cannot afford the most recently developed microprocessors (i.e., those with the highest clock rates.)

After the appropriate modem technology is selected, a bit rate at which data will be transferred must be selected. The selection of the bit rate is, of course, constrained by the choice of modem technologies. Only one of the rates available within the selected technology may be chosen. The choice of bit rates is based primarily on the quality of the telephone line connecting the two modems. If the line is essentially free from noise, the maximum available rate may be selected. If there is a significant amount of noise on the line, a lower bit rate may be required in order to reduce the number of errors due to the noise. Once the bit rate is selected, the handshaking process is complete and the modems can begin transferring data.

A number of situations may arise during or after data transfer which alter the conditions that resulted in the initial protocol selection. For example, a transfer of a large amount of real-time data may require the most recent common technology, the highest available bit rate and a large fraction of the microprocessor time. A connection is established between the modems and the appropriate technology and bit rate are selected. Upon completion of the transfer, the user may wish to execute a computation-intensive application, yet maintain the modem connection. If the modems use the most recent common technology, the performance of the application may be degraded because of insufficient microprocessor resources, even though the modem connection is not being used at the same time.

In one embodiment of the invention, the modems may be retrained to select a bit rate which is more suitable to the user's requirements. In the example, the modems could reselect a lower bit rate, which would in turn make more of the microprocessor time available to the applications which need it. During the period in which the modems are connected, the modems monitor several parameters which may indicate that it would be advantageous to select a different bit rate for the connection. These parameters may include the quality of the telephone line used by the connection, the amount or type of data which needs to be transferred, the system resources requested by other applications, and the like. When it is determined from these parameters that a different bit rate should be selected, one of the modems transmits a signal to the other indicating that retraining should be attempted. If the other modem agrees to the request, the modems re-enter the stage of the handshaking process in which the bit rate is selected. The selection of the bit rate may be based on any or all of the parameters rather than simply on the quality of the telephone line. The parameters may indicate that the newly selected bit rate should be either greater or less than the currently selected rate.

Although retraining the modems to use a different bit rate may partially solve the problem of having a communication protocol which is not best suited to the existing conditions in the computing environment, retraining alone may not be the most effective solution. For example, if V.34 technology is being used at a rate of 28,000 bits per second, it may conserve system resources to retrain the modems to operate at 2400 bits per second, but this still requires more resources than if the modems were using V.22bis technology at 2400 bits per second. The difference in microprocessor utilization between V.34 and V.22bis technologies can be seen in FIG. 3. One embodiment of the invention therefore also provides for renegotiation of the modem technology used in the connection as well as retraining of the modems.

Many of the same parameters that are monitored to determine whether retraining is required are also monitored to determine whether it would be advantageous to renegotiate the modem technology. There may also be parameters that indicate a need to re-select the modem technology which are not monitored in regard to retraining. When one of the modems determines that it would be beneficial to select a new modem technology, it sends a signal to the other modem requesting that the modems renegotiate the technology. If the request is accepted by the other modem, the request is acknowledged and the modems re-enter the negotiation phase of the handshaking procedure. After the new technology is selected, the modems are trained and an appropriate bit rate is selected as well. The modems can then continue the transfer of data between them.

For example, if a modem connection is established on a telephone line that has no carrier phase jitter, the modems may negotiate a technology which does not perform well in the presence of such jitter. If one modem observes that a substantial amount of jitter has arisen on the line, it may request renegotiation so that a technology which is immune to jitter can be selected. The requesting modem may force selection of this technology by refusing to acknowledge that it employs other technologies. After the new technology is selected, the modems can continue transferring data.

As another example, modems that employ newer technologies typically require more power than those employing older technologies. In a notebook computer, minimizing power dissipation is a primary concern because of the desire to conserve battery power. If a notebook user initiates a modem connection (to use a web browser, for instance) but is called away for some reason, the notebook may be configured to power itself down so that the display, disk drive and other components do not draw power from the battery. If the modem connection is maintained, however, a prior art modem cannot be powered down and continues to dissipate power even though little or no data is being transferred. One embodiment of the invention, on the other hand, can detect inactivity (i.e., no data is transferred) for a given period of time and request renegotiation in which a technology having lower power dissipation can be selected.

As described above, one embodiment of the invention senses parameters relating to the computing environment and can renegotiate a technology which uses more or less of the resources of the computer. Such conservation of shared resources can be achieved not only in computing environments such as personal computers (PCs), but also in environments such as modem pools. For example, in a central office modem pool which implements higher-capacity xDSL (Digital Subscriber Lines) technologies and lower-capacity xDSL technologies, a certain number of clients can establish connections to the modem pool using the higher-capacity technologies. If renegotiation is not possible, additional clients who attempt to establish connections will be unable to do so. In one embodiment of the invention, however, the modem pool can renegotiate the current connections to select the lower-capacity xDSL technologies, thereby freeing resources so that additional clients may establish connections.

It should also be noted that embodiments of the invention are not limited to software implementations. Stand-alone hardware modems (referring to both internal and external hardware) may easily be configured as described herein.

The differences between modem technologies are not limited to the range of bit rates at which data can be transferred. As described above, the technologies may also differ in microprocessor utilization and power dissipation. In fact, it is anticipated that some groups of future modem technologies may have few, if any differences in bit rates or power dissipation between technologies in the group. The technologies may instead be distinguished by different, and possibly mutually exclusive, features. For example, one technology may be have a "fail-safe" feature which guarantees that the received data will never contain an error. This may require that the modem slow down the data transfer and build up turn-around delays in order to perform its error correction. This may be incompatible with a modem technology which supports real-time functions such as voice transmissions. It is therefore contemplated that embodiments of the invention may detect requests (or other indications) to utilize features which are not implemented in a currently selected technology and renegotiate to select a new technology which implements the desired feature.

As noted above, one embodiment of the invention is implemented in software. Because of the increasing computational power of microprocessors, it is possible to implement modems through software running on the microprocessors. Such software-implemented (or "soft") modems provide a cost effective alternative to stand-alone hardware implementations. Soft modems also allow for a great deal of flexibility in implementation and upgradability. Because soft modems are not stand-alone solutions, however, they are subject to the limitations of the microprocessors in which they execute. More specifically, they must compete for potentially scarce system resources. This competition for resources is aggravated by the fact that soft modems are real-time applications and therefore have latency requirements with respect to the analog converters which are used to interface with telephone lines. Software modems may also require a large portion of the available processing time.

Because the modem is implemented in the microprocessor, information is readily available to allow the modem to detect conditions which indicate that a new modem technology should be selected. As an example, it is known to the modem software, which uses a sampled data algorithm, that interrupts from the modem sampling circuitry should occur at a steady rate. The modem application can calculate its microprocessor utilization by measuring or having a priori knowledge of the interrupt rate and by measuring the average time spent by the algorithm in interrupt context after each interrupt. Since the microprocessor clock rate is known, the modem application can determine the utilization by comparing the cycles used by the application to the number of cycles available.

Further, while the foregoing embodiments may renegotiate the modem technology in response to changes in the computing environment, it is contemplated that this may also take place in response to a user request. For example, it is noted above that a notebook computer may go into a standby mode to conserve power. One embodiment described above for implementation in such a computer may renegotiate to select a technology having low power consumption after a period of inactivity. Rather than waiting for a period of inactivity, the user may request that the modem renegotiate to select a more efficient technology (i.e., to enter a standby mode.)

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for communicating between a first modem and a second modem, the method comprising:

establishing a connection between the first modem and the second modem;

negotiating a first transfer protocol for communications between the first modem and the second modem;

transferring data between the first modem and the second modem according to the first transfer protocol through the connection;

detecting a change in one or more operating conditions of a first computer system, wherein the first modem is implemented in the first computer system, wherein said detecting a change in one or more operating conditions includes one or more of the following:

detecting a change in the processing load of the first computer system, detecting a user request to negotiate the second transfer protocol, and detecting a period of inactivity between the first modem and the second modem; and negotiating a second transfer protocol for communications between the first modem and the second modem responsive to said detecting a change, wherein said negotiating the second transfer protocol is performed through the connection and prior to terminating the connection between the first modem and the second modem.

2. The method as recited in claim 1 further comprising detecting a change in one or more operating conditions of a second computer system, wherein the second modem is implemented in the second computer system, and wherein said negotiating the second transfer protocol responsive to said detecting a change in one or more operating conditions of the second computer system.

3. The method as recited in claim 1, wherein said establishing a connection comprises placing a call on a telephone line from the first modem to the second modem, negotiating the first transfer protocol and beginning to transfer data through the connection between the first modem and the second modem.

4. The method as recited in claim 1, wherein said establishing a connection comprises initiating a connection on a digital data line between the first modem and the second modem, negotiating a first transfer protocol and beginning to transfer data through the connection between the first modem and the second modem.

5. The method as recited in claim 4, wherein the digital data line is a digital subscriber line (DSL).

6. The method as recited in claim 4, wherein the digital data line is an integrated services digital network (ISDN) line.

7. The method as recited in claim 1 further comprising a handshake procedure, wherein the handshake procedure includes said negotiating the first transfer protocol for communications between the first modem and the second modem.

8. The method as recited in claim 1, wherein the first transfer protocol defines a first modem technology and the second transfer protocol defines a second modem technology that is distinct from the first modem technology.

9. A modem comprising:

means for establishing a connection to a remote modem;

transmitting/receiving means for transmitting data to the remote modem and receiving data from the remote modem, wherein the transmitting/receiving means is capable of transmitting and receiving data according to alternate ones of a plurality of transfer protocols;

detecting means coupled to said transmitting/receiving means, wherein the detecting means is configured for detecting a plurality of sets of operating conditions of a computer system in which the modem is implemented, wherein each of the sets of operating conditions corresponds to one of the plurality of transfer protocols;

wherein the transmitting/receiving means is configured to negotiate a first one of the plurality of transfer protocols corresponding to a first one of the sets of operating conditions and to transmit and receive through the connection according to the first one of the plurality of transmission protocols; and means for reconfiguring the transmitting/receiving means to transmit and receive additional data through the connection according to a second one of the plurality of transfer protocols in response to detecting a change from the first one of the sets of operating conditions of the computer system to a second one of the sets of operating conditions of the computer system, wherein said detecting a change from the first one of the sets of operating conditions of the computer system to the second one of the sets of operating conditions includes one or more of the following:

detecting a change in the processing load of the computer system, detecting a user request to negotiate the second transfer protocol, and detecting a period of inactivity between the modem and the remote modem.

10. The modem as recited in claim 9, wherein said establishing a connection comprises placing a call on a telephone line from the modem to the remote modem, negotiating the first transfer protocol, and beginning to transfer data through the connection between the modem and the remote modem.

11. The modem as recited in claim 9, wherein said establishing a connection comprises initiating a connection on a digital data line between the modem and the remote modem, negotiating a first transfer protocol, and beginning to transfer data through the connection between the modem and the remote modem.

12. The modem as recited in claim 11, wherein the digital data line is a digital subscriber line (DSL).

13. The modem as recited in claim 11, wherein the digital data line is an integrated services digital network (ISDN) line.

14. The modem as recited in claim 9 further comprising a means for performing a handshake procedure with the remote modem, wherein the handshake procedure includes said negotiating the first transfer protocol for communications between the modem and the remote modem.

15. A computer system comprising:

a processor;

a modem interface coupled to the processor and a data line;

a modem configured for:

establishing a connection through the data line between the computer system and a remote modem;

negotiating a first transfer protocol for communications between the computer system and the remote modem;

transferring data through the connection between the computer system and the remote modem according to the first transfer protocol;

detecting a change in one or more operating conditions; and negotiating a second transfer protocol for communications between the computer system and the remote modem responsive to said detecting a change, wherein said negotiating the second transfer protocol is performed through the connection and prior to terminating the connection between the first modem and the second modem, wherein the first transfer protocol differs from the second transfer protocol with respect to at least one of a data compression format or an error correction format.

16. The computer system as recited in claim 15, wherein said detecting a change in one or more operating conditions comprises detecting a change in the processing load of the computer system.

17. The computer system as recited in claim 15, wherein said detecting a change in one or more operating conditions comprises detecting a user request to negotiate a second transfer protocol.

18. The computer system as recited in claim 15, wherein said detecting a change in one or more operating conditions comprises detecting a period of inactivity between the computer system and the remote modem.

19. The computer system as recited in claim 15, wherein said establishing a connection comprises placing a call on a telephone line from the computer system to the remote modem, negotiating the first transfer protocol and beginning to transfer data between the computer system and the remote modem.

20. The computer system as recited in claim 15, wherein sad establishing a connection comprises initiating a connection on a digital data line between the computer system and the remote modem, negotiating a first transfer protocol, and beginning to transfer data through the connection between the computer system and the remote modem.

21. The computer system as recited in claim 20, wherein the digital data line is a digital subscriber line (DSL).

22. The computer system as recited in claim 20, wherein the digital data line is an integrated services digital network (ISDN) line.

23. The computer system as recited in claim 16, wherein the modem is further configured for initiating a handshake procedure, wherein the handshake procedure includes said negotiating the first transfer protocol for communications between the computer system and the remote modem.

24. A method comprising:

establishing a connection through the data line between a first modem and a second modem;

negotiating a first transfer protocol for communications between the first modem and the second modem;

transferring data through the connection between the first modem and the second modem according to the first transfer protocol;

detecting a change in one or more operating conditions; and negotiating a second transfer protocol for communications between the first modem and the second modem responsive to said detecting a change, wherein said negotiating the second transfer protocol is performed through the connection and prior to terminating the connection between the first modem and the second modem, wherein the first transfer protocol differs from the second transfer with respect to at least one of a data compression format or an error correction format.

25. The method as recited in claim 24, wherein said detecting a change in one or more operating conditions comprises detecting a change in the processing load of a first computer system, wherein the first modem is implemented in the first computer system.

26. The method as recited in claim 24, wherein said detecting a change in one or more operating conditions comprises detecting a user request to negotiate a second transfer protocol.

27. The method as recited in claim 24, wherein said detecting a change in one or more operating conditions comprises detecting a period of inactivity between the first modem and the second modem.

28. The method as recited in claim 24, wherein said establishing a connection comprises placing a call on a telephone line from the first modem to the second modem, negotiating the first transfer protocol and beginning to transfer data through the connection between the first modem and the second modem.

29. The method as recited in claim 24, wherein said establishing a connection comprises initiating a connection on a digital data line between the first modem and the second modem, negotiating a first transfer protocol and beginning to transfer data through the connection between the first modem and the second modem.

30. The method as recited in claim 29, wherein the digital data line is a digital subscriber line (DSL).

31. The method as recited in claim 29, wherein the digital data line is an integrated services digital network (ISDN) line.

32. The method as recited in claim 24 further comprising a handshake procedure, wherein the handshake procedure includes said negotiating the first transfer protocol for communications between the first modem and the second modem.

* * * * *